(12) United States Patent
Nakfour et al.

(10) Patent No.: US 10,354,350 B2
(45) Date of Patent: *Jul. 16, 2019

(54) METHOD AND SYSTEM FOR INFORMATION MANAGEMENT FOR AN INCIDENT RESPONSE

(71) Applicant: MOTOROLA SOLUTIONS, INC, Chicago, IL (US)

(72) Inventors: Juana E Nakfour, Hawthorn Woods, IL (US); Daniel S Griesmann, Villa Park, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 353 days.

This patent is subject to a terminal disclaimer.

(21) Appl. No.: 15/296,441

(22) Filed: Oct. 18, 2016

(65) Prior Publication Data

US 2018/0108100 A1 Apr. 19, 2018

(51) Int. Cl.
*G08B 3/00* (2006.01)
*G06Q 50/26* (2012.01)
*G06Q 10/06* (2012.01)

(52) U.S. Cl.
CPC ..... *G06Q 50/265* (2013.01); *G06Q 10/06311* (2013.01); *G06Q 10/06316* (2013.01)

(58) Field of Classification Search
CPC ... H04M 3/5116; G08B 25/006; G08B 25/016
USPC ...... 340/691.6, 539.11, 539.13, 540; 379/37, 379/42–45; 455/404.1
See application file for complete search history.

(56) References Cited

U.S. PATENT DOCUMENTS

| | | | |
|---|---|---|---|
| 4,095,222 A | 6/1978 | Mooney, Jr. | |
| 4,232,315 A | 11/1980 | Kern | |
| 6,078,281 A | 6/2000 | Milkovich et al. | |
| 6,856,576 B2 | 2/2005 | Preston | |
| 6,885,611 B2 | 4/2005 | Preston | |
| 7,245,216 B2 | 7/2007 | Burkley et al. | |
| 7,298,535 B2 | 11/2007 | Kuutti et al. | |
| 7,880,607 B2 | 2/2011 | Olson et al. | |
| 8,523,847 B2 | 9/2013 | Dewey et al. | |
| 8,644,792 B2 | 2/2014 | Lontka et al. | |
| 8,706,414 B2 | 4/2014 | Funk et al. | |

(Continued)

FOREIGN PATENT DOCUMENTS

| | | |
|---|---|---|
| AU | 2008226932 B2 | 9/2011 |
| EP | 1296745 B1 | 9/2012 |

(Continued)

*Primary Examiner* — Toan N Pham (57) ABSTRACT

A method and system for information management for an incident response. The method comprises the following steps: A first communication allocating a responder to a specific assignment relating to the incident is received at a computing device from a command device. A second communication identifying assignment information that corresponds to the specific assignment is transmitted from the computing device to a graphic display device associated with the responder. Real-time sensor data is received at the computing device from one or more sensors. A third communication indicating progress in the specific assignment based at least in part on the real-time sensor data is transmitted from the computing device to one or more of the command device and the graphic display device.

13 Claims, 9 Drawing Sheets

(56) References Cited

U.S. PATENT DOCUMENTS

| | | |
|---|---|---|
| 9,300,799 B2 | 3/2016 | Brown et al. |
| 9,508,248 B2 * | 11/2016 | Nakfour .................. H04W 4/90 |
| 2002/0196202 A1 | 12/2002 | Bastian et al. |
| 2006/0158329 A1 | 7/2006 | Burkley et al. |
| 2006/0211404 A1 | 9/2006 | Cromp et al. |
| 2008/0023002 A1 | 1/2008 | Guelzow et al. |
| 2010/0001187 A1 | 1/2010 | Fenske et al. |
| 2010/0315228 A1 | 12/2010 | Grilliot et al. |
| 2011/0151825 A1 | 6/2011 | Mathis et al. |
| 2014/0038668 A1 | 2/2014 | Vasavada et al. |
| 2014/0243036 A1 | 8/2014 | Kouwe |

FOREIGN PATENT DOCUMENTS

| | | |
|---|---|---|
| WO | 03060830 A1 | 7/2003 |
| WO | 2014015378 A1 | 1/2014 |

\* cited by examiner

METHOD AND SYSTEM FOR INFORMATION MANAGEMENT FOR AN INCIDENT RESPONSE

The present application is a continuation application of U.S. patent application Ser. No. 14/568,261 filed in the United States Patent Office on Dec. 12, 2014, the entire contents of which is incorporated herein by reference.

BACKGROUND OF THE INVENTION

When incidents such as natural disasters, crime investigations, and wildfires occur, responding to these incidents effectively can save lives, limit injuries and prevent property damage. To prepare for, prevent, respond to, and recover from incidents, the National Incident Management System (NIMS) was developed by the Federal Emergency Management Agency (FEMA). NIMS can provide a consistent nationwide approach for all levels of government to work together regardless of cause, size, or complexity. NIMS includes an Incident Command System (ICS) which standardizes incident organizational structure for on-scene management of incidents. The ICS is an example where user groups are established to improve efficiency. It can incorporate a Unified Command (UC) approach, whereby individuals can be designated by their jurisdictional authorities to jointly determine objectives, plans and priorities, as well as work together to execute them.

During incident preparation and/or response, there is a need to rapidly align all electronic communication (e.g., PTT, Video, Conferencing, Voice, Imaging, Data, etc.) with the ICS organizational chart, which is a role-based hierarchy of groups of one or more users, where each user group is associated with the same role. Communication groups are assigned to each user group. In one example, responders performing the same role at the incident are assigned, or affiliated, to the same primary communication group. This primary communication group facilitates communication between all responders performing the same role. One or more responders in each group may be further designated as a leader of that group. As a group leader, such users must also monitor, or scan, the primary communication groups of hierarchical user groups that are subordinate to or peers with their own; such groups are referred to as the leader's secondary communication groups. This permits the leader to maintain situational awareness of the user groups subordinate to and peer with him or her in the hierarchy. These primary and secondary communication group assignments are then dynamically programmed into the applicable narrowband and/or broadband communication devices carried by the responders.

However, current methods of communicating the latest ICS command structure, objectives, and progress can be inefficient. Voice communication is fast but cannot be referenced, lacks details and requires common terms to be used. Further, progress against many complex objectives can be difficult and time consuming to track and communicate by voice in a large incident.

A further problem is that officers responding to an incident are often working with unfamiliar people in an unfamiliar location and therefore can find it difficult to identify people and locations.

Accordingly, there is a need for an improved method of, and system for, information management for an incident response.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some embodiments, the present invention includes a method of information management for an incident response. The method comprises the following steps: A first communication allocating a responder to a specific assignment relating to the incident is received at a computing device from a command device. A second communication identifying assignment information that corresponds to the specific assignment is then transmitted from the computing device to a graphic display device associated with the responder. Real-time sensor data is received at the computing device from one or more sensors. A third communication indicating progress in the specific assignment based at least in part on the real-time sensor data is then transmitted from the computing device to one or more of the command device and the graphic display device.

Figure 1:
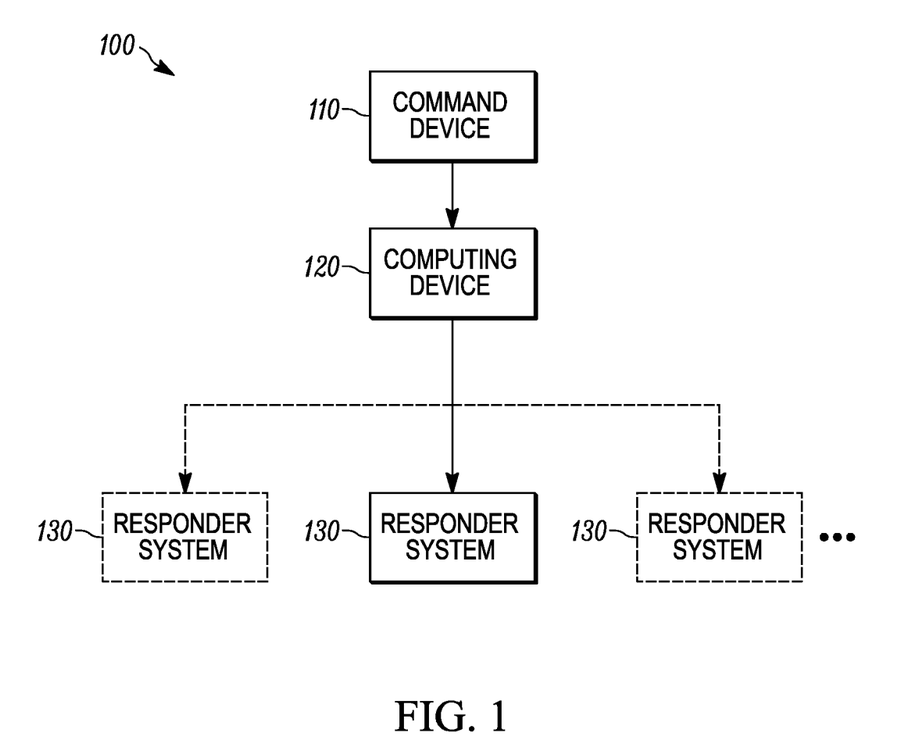
FIG. 1 is a block diagram of a system in accordance with some embodiments.

FIG. 1 is a block diagram of a system 100 in accordance with some embodiments. The system 100 comprises a computing device 120 in communication with a command device 110 and one or more responder systems 130. The command device 110 is used by a commander or a command team to organize an incident response, and the one or more responder systems 130 are used by one or more responders responding to the incident.

The computing device 120 can be, for example, a server that is remote to the command device 110 and the one or more responder systems 130, a responder device of the responder, or a server of a command center where the command device 110 is located.

In some embodiments, the system 100 is an Incident Command System (ICS). In these embodiments, the computing device 120 comprises an Incident Command System (ICS) server, and the command device 110 and the one or more responder systems 130 comprise, for example, ICS clients.

In preferred embodiments, the one or more responder systems 130 each comprise one or more sensors and a display. In some embodiments, where the computing device 120 is remote to the one or more responder systems 130, the responder systems 130 can each comprise a responder device that is in communication with the computing device 120, the display, the one or more sensors and/or the responder devices of other responder systems 130. In some embodiments, the computing device 120 is in direct communication with the display and the one or more sensors of a responder system 130 and can also be in communication with the one or more sensors of other responder systems 130.

An augmented reality view can be provided to the responder via the display to highlight information relevant to the responder's current mission. For example, a personalized dynamic augmented reality view can be created for each responder. The augmented reality view can highlight and/or label assets, locations, vehicles, and other responders relevant to or assigned to the responder's incident, role, group, or objective.

The display is provided within the responder's current frame of view, for example as a head up display (HUD) located in a vehicle of the responder or worn by the responder. Assignment information such as objects, people and locations can be identified on the display to reduce the administrative workload for the responder. Objectives can also be communicated dynamically to the responder via the display. Assignment progress can be determined automatically using the one or more sensors in combination with analytics including real-time object recognition on the responder system 130 and/or the computing device 120. The determined assignment progress can then be communicated to the responder on the display.

Figure 2:
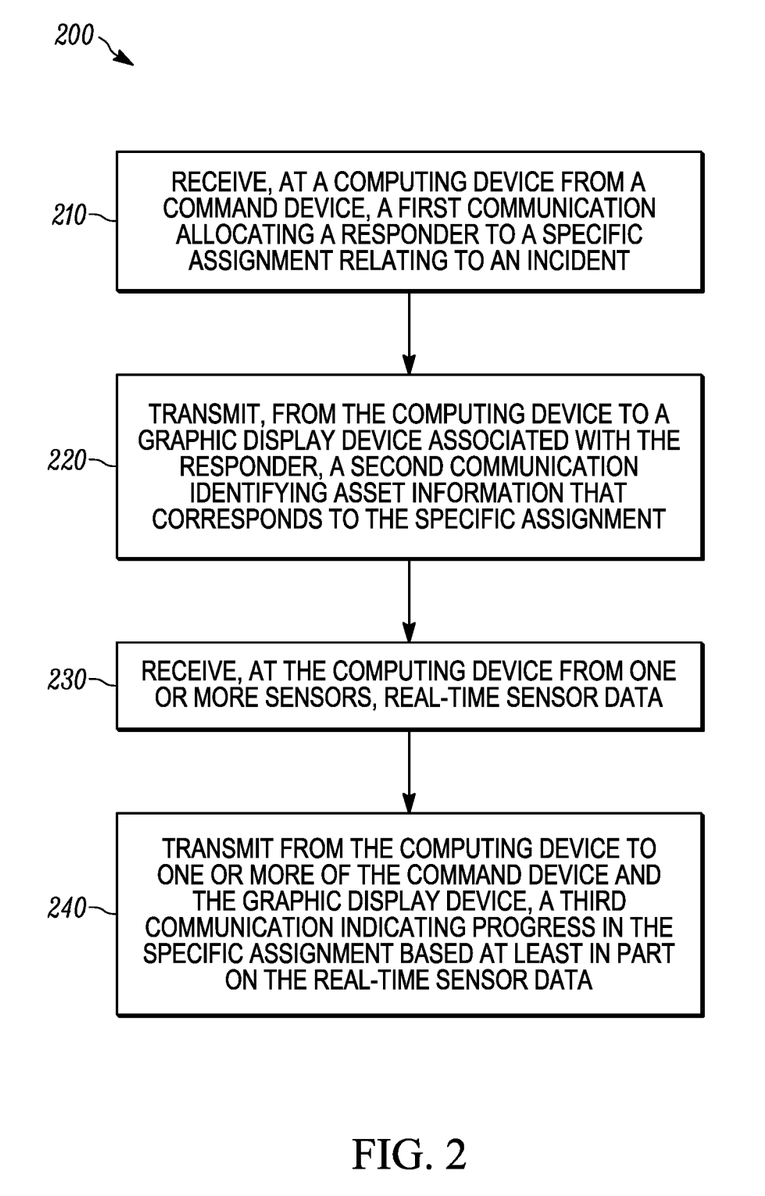
FIG. 2 is a flowchart of a method of information management for an incident response in accordance with some embodiments.

FIG. 2 is a flowchart of a method 200 of information management for an incident response in accordance with some embodiments. For example, the method 200 can be performed in the system 100. The method 200 comprises the following steps:

At step 210, a first communication allocating a responder to a specific assignment relating to the incident is received at a computing device from a command device. For example, allocating to the responder the specific assignment can comprise allocating the responder to a responder group that is allocated to the specific assignment and/or allocating a responder group including the responder to the specific assignment.

In some embodiments, information defining the incident is also received at the computing device from the command device. For example, the information defining the incident can include an incident type, location/boundaries/significant landmarks, assets, and overall objectives for one or more responders. The information can also include each responder's role in the incident along with his/her group membership(s) and group or individual objectives/specific assignment.

At step 220, a second communication identifying assignment information that corresponds to the specific assignment is transmitted from the computing device to a graphic display device associated with the responder. In some embodiments, the assignment information is based at least in part on a role of the responder in the responder group. The assignment information includes, for example, at least one of the following: an objective for the responder; one or more activities for the responder; a workflow associated with the assignment; one or more locations associated with the incident; one or more objects associated with the incident; one or more people associated with the incident; and one or more other responder devices allocated to the incident.

At step 230, real-time sensor data is received at the computing device from one or more sensors. The one or more sensors can be associated with the responder, another responder to the incident and/or a vehicle of the responder or the other responder. For example, the real-time sensor data can include one or more of the following: a location of the responder; a motion of the responder; an orientation of the responder; video of a view seen by the responder; and audio at the responder. The real-time sensor data can also include, for example, a location of, a motion of, an orientation of, a video of a view seen by, or audio at another responder to the incident, and/or the responder or a responder's vehicle.

At step 240, a third communication indicating progress in the specific assignment based at least in part on the real-time sensor data is transmitted from the computing device to one or more of the command device and the graphic display device. For example, progress can be determined by identifying one or more objects, people and/or locations associated with the specific assignment based on the real-time sensor data.

Figure 3:
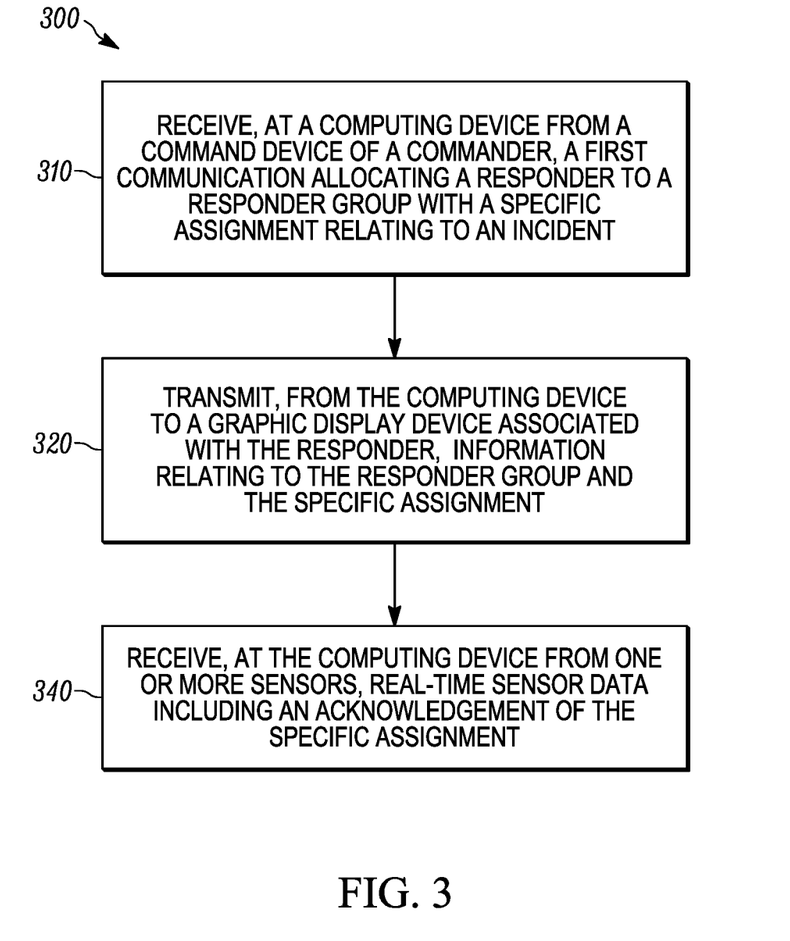
FIG. 3 is a flowchart of a method for allocating a responder to a responder group with a specific assignment relating to an incident in accordance with some embodiments.

FIG. 3 is a flowchart of a method 300 for allocating a responder to a responder group with a specific assignment relating to an incident in accordance with some embodiments. For example, the method 300 can be performed as part of the method 200. The method 300 comprises the following steps:

At step 310, a first communication allocating the responder to the responder group is received at a computing device from a command device.

At step 320, information relating to the responder group and the specific assignment is transmitted from the computing device to a graphic display device associated with the responder. This information can also be transmitted to other devices in the responder system, for example, via a personal area network (PAN). In some embodiments, the information also comprises information relating to the commander. In some embodiments, the graphic display device is a head up display (HUD).

At step 330, real-time sensor data including an acknowledgement of the specific assignment is received at the computing device from one or more sensors. In some embodiments, the responder acknowledges the assignment using gestures, such as, hand gestures or eye movements. In some embodiments, the responder acknowledges the assignment using another means, such as voice, text or voice to text. These acknowledgements can be interpreted in the responder system and/or transmitted as, for example, video, audio or text and be interpreted at the computing device.

In some embodiments, the acknowledgements are part of the real-time sensor data in step 230 of the method 200. For example, the real-time sensor data can include an acknowledgement of the specific assignment in the form of one of the following: a video or image of a gesture; an image of a drawn symbol; an audio acknowledgement; and a voice to text transcript. The progress can be updated based on the acknowledgement.

Figure 4:
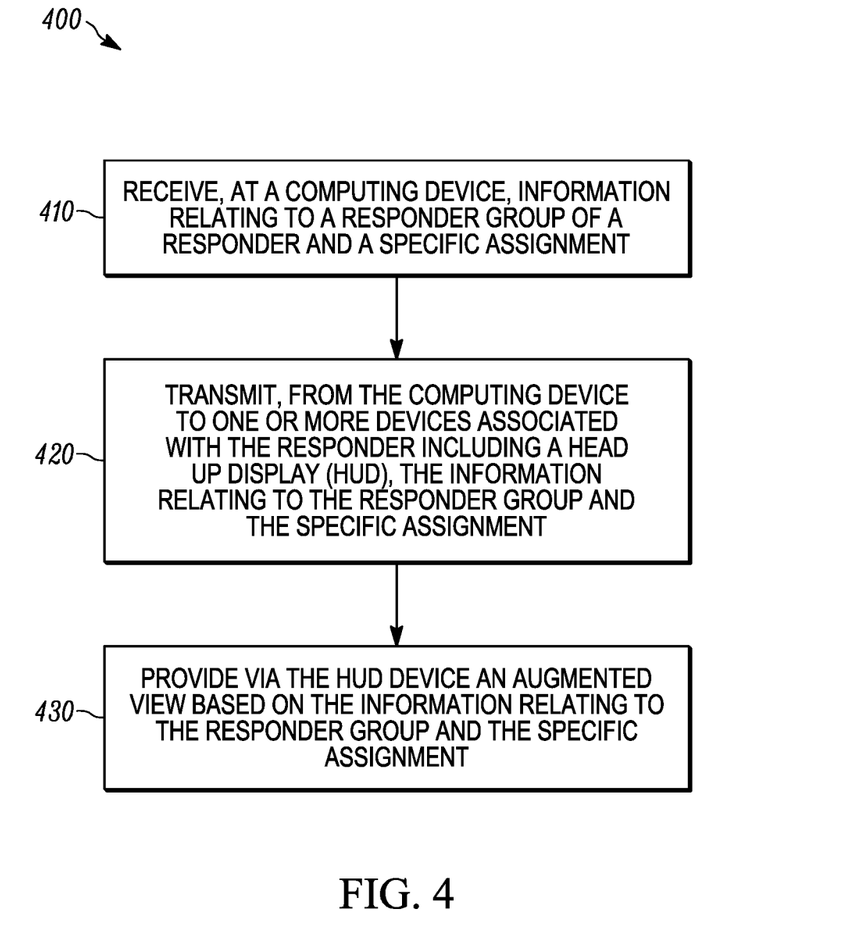
FIG. 4 is a flowchart of a method for generating a personalized augmented reality view for a responder in accordance with some embodiments.

FIG. 4 is a flowchart of a method 400 for generating a personalized augmented reality view for a responder in accordance with some embodiments. For example, method 400 can be performed at a computing device in coordination with method 200 and/or method 300. The method 400 comprises the following steps:

At step 410, information relating to a responder group of the responder and a specific assignment is received at a computing device. The information can, for example, identify the responder group, the specific assignment and the commander. The information can also include assignment information such as, an objective for the responder, one or more activities for the responder; a workflow associated with the assignment; one or more locations associated with the incident, one or more objects associated with the incident, one or more people associated with the incident, one or more other responder devices allocated to the incident.

At step 420, the information relating to the responder group and the specific assignment is transmitted from the computing device to one or more devices associated with the responder including a head up display (HUD).

At step 430, the HUD provides an augmented view based on the information relating to the responder group and the specific assignment. For example, the augmented view can highlight and/or label objects, such as assets, locations, vehicles and other responders assigned to the incident, role, group or objective, and provide information regarding these objects. The augmented view can also provide an indicator to show progress in the specific assignment.

Figure 5:
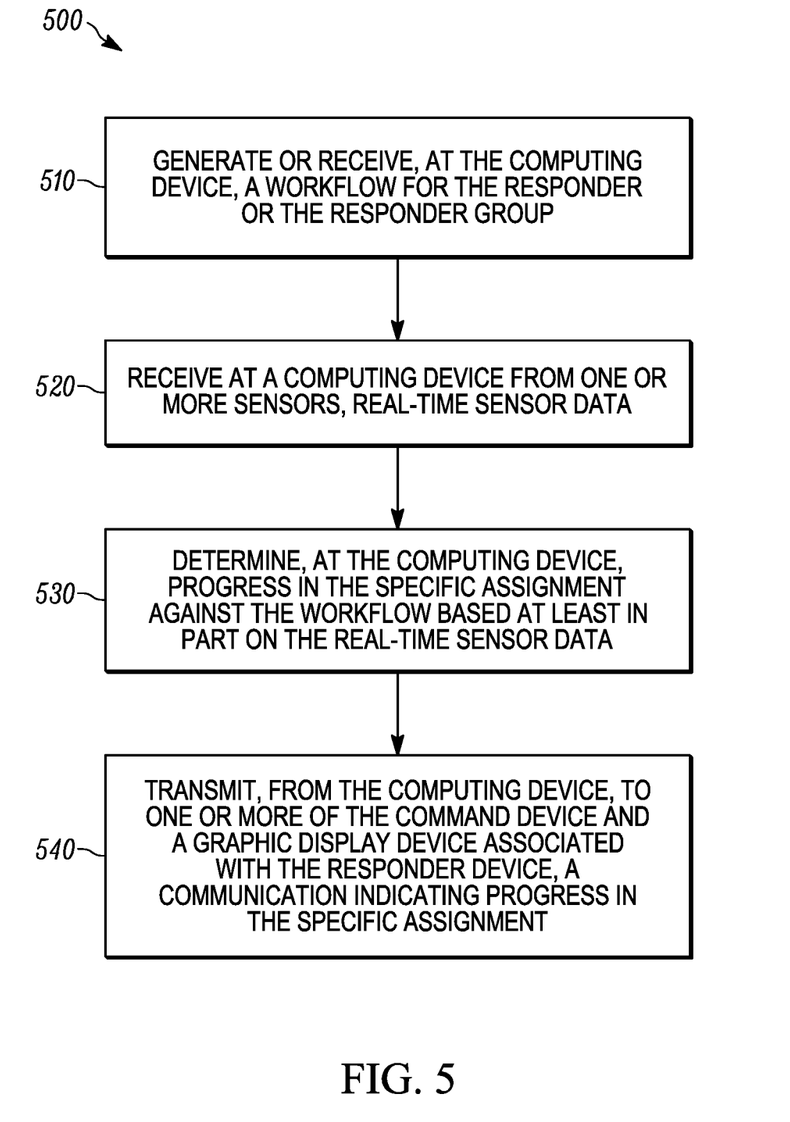
FIG. 5 is a flowchart of a method for measuring assignment progress in accordance with some embodiments.

FIG. 5 is a flowchart of a method 500 for measuring assignment progress in accordance with some embodiments. For example, the method 500 can be performed at a responder system and computing device in coordination with the method 200, method 300 and/or method 400. The method 500 comprises the following steps:

At step 510, a workflow for the responder or the responder group is generated or received at the computing device. For example, an appropriate workflow can be retrieved or created based on one or more factors at the computing device or retrieved or created based on one or more factors at the command device or the responder system and then transmitted to the computing device. In some embodiments, the workflow is generated based on the specific assignment of the responder. For example, the specific assignment could be a role, a task and/or an objective of the responder. The workflow can also be based on incident scene data received from a command device, the responder group and/or a type of the incident. In some embodiments, the assignment information is based on the workflow for the specific assignment. The assignment information can include, for example, an objective for the responder, one or more locations associated with the incident, one or more objects associated with the incident, one or more people associated with the incident and/or one or more other responder devices allocated to the incident.

At step 520, real-time sensor data is received at the computing device from one or more sensors. The one or more sensors can be located, for example, on the responder, on a vehicle of the responder, and/or on another responder or a vehicle of the other responder. The one or more sensors can include, for example, at least one of the following: an accelerometer; a gyroscope; a digital camera; a microphone; a Global Positioning System (GPS) receiver; and a proximity sensor. The sensor data can include, for example, a location of the responder, a motion of the responder, an orientation of the responder, video of a view seen by the responder and/or audio at the responder. In some embodiments, the sensor data includes real-time video from a camera associated with the HUD. The real-time sensor data can also include, for example, a location of; a motion of; an orientation of; a video of a view seen by; and audio at another responder to the incident, and/or the responder or the other responder's vehicle.

In such a way, the computing device can collect and store responder activity data (e.g., a walking path or personal interactions) using video cameras, microphones, motion, GPS, and any other sensors mounted on an officer's HUD or body, vehicles, or other nearby environments.

At step 530, progress in the specific assignment is determined at the computing device against the workflow based at least in part on the real-time sensor data. In some embodiments, object recognition, video analytics and/or media tagging are used to identify objects and determine progress against the workflow. For example, the object recognition, video analytics and/or media tagging may be implemented at the computing device and/or at the responder system in real-time.

In some embodiments, an object of interest associated with the specific assignment can be detected in at least one video frame of a video stream from the camera associated with the HUD. The object of interest can be, for example, one of the following within the view of the responder: an asset; a vehicle; a person of interest; and another responder.

At step 540, a communication indicating progress in the specific assignment is transmitted from the computing device to one or more of the command device and a graphic display device associated with the responder device, for example, the HUD.

In some embodiments, instructions for interacting with the object of interest are transmitted from the computing device to the HUD and displayed on the HUD. In some embodiments, the object of interest is highlighted on the HUD.

In some embodiments, a first metadata is determined to identify the object of interest and the first metadata is displayed on the HUD. The metadata can be confirmed by the responder and updated if needed. For example, the computing device and/or the responder system can receive feedback via the one or more of the sensors that the first metadata does not match the object of interest, and associate a second metadata with the object of interest based on the feedback.

Figure 6:
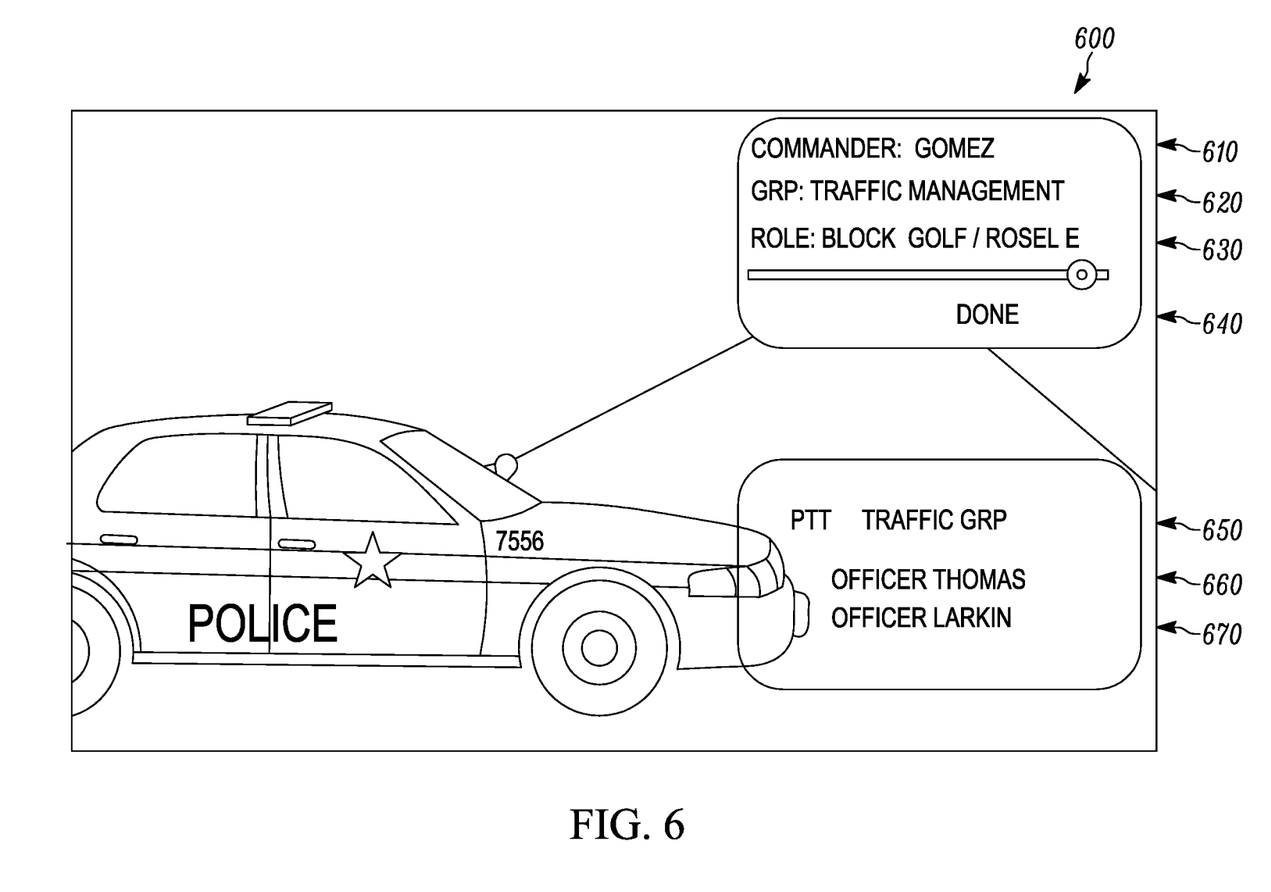
FIG. 6 is an example augmented view of a Head Up Display (HUD) in accordance with some embodiments.

FIG. 6 is an example augmented view of the HUD in accordance with some embodiments. The augmented view comprises a first information block 600 providing information about the commander 610, the group of the responder 620, the current role/task of the responder 630 and the progress in the role/task 640. As shown in this example a current role/task instruction is to block an intersection.

The augmented view comprises a second information block 650 providing information about an object in the augmented view. The object is a police car and information is provided including text about the group to which the police car is assigned 660 and text describing the officers within the police car 670. For example, as shown the police car is in a position to block the intersection and therefore information about the progress in the role/task 640 is shown as "DONE".

Figure 7:
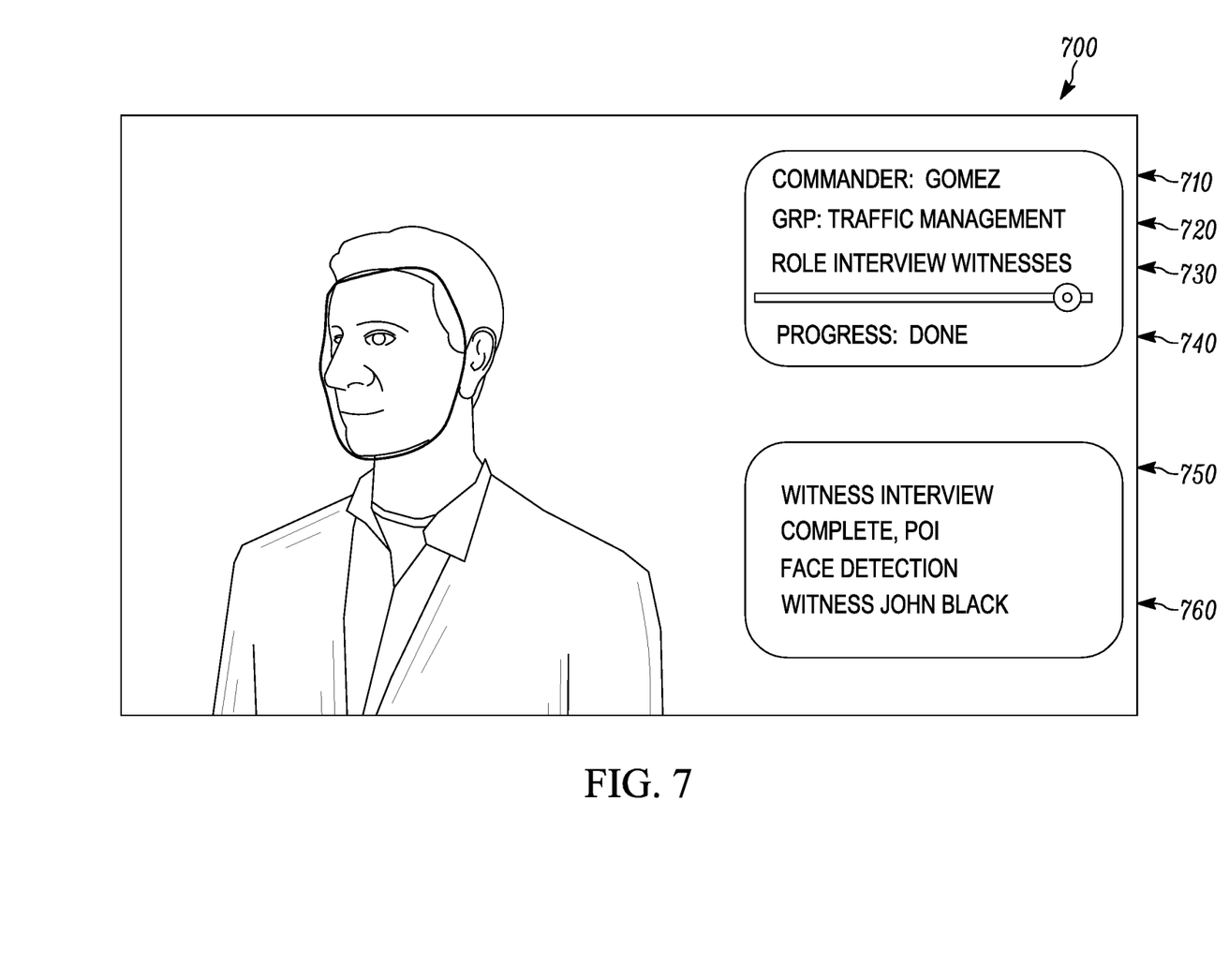
FIG. 7 is another example augmented view of a HUD in accordance with some embodiments.

FIG. 7 is another example augmented view of the HUD in accordance with some embodiments. The augmented view again comprises a first information block 700 providing information about the commander 710, the group of the responder 720, the current role/task of the responder 730 and the progress in the role/task 740. For example, as shown the information about the current role/task 730 is to interview witnesses.

The augmented view comprises a second information block 750 providing information about an object in the augmented view. In this example the object is a witness and information is provided about the witness and the interview including the name of the witness 760. For example, the name of the witness 760 may have been determined from a database of the computing device via face detection.

Figure 8:
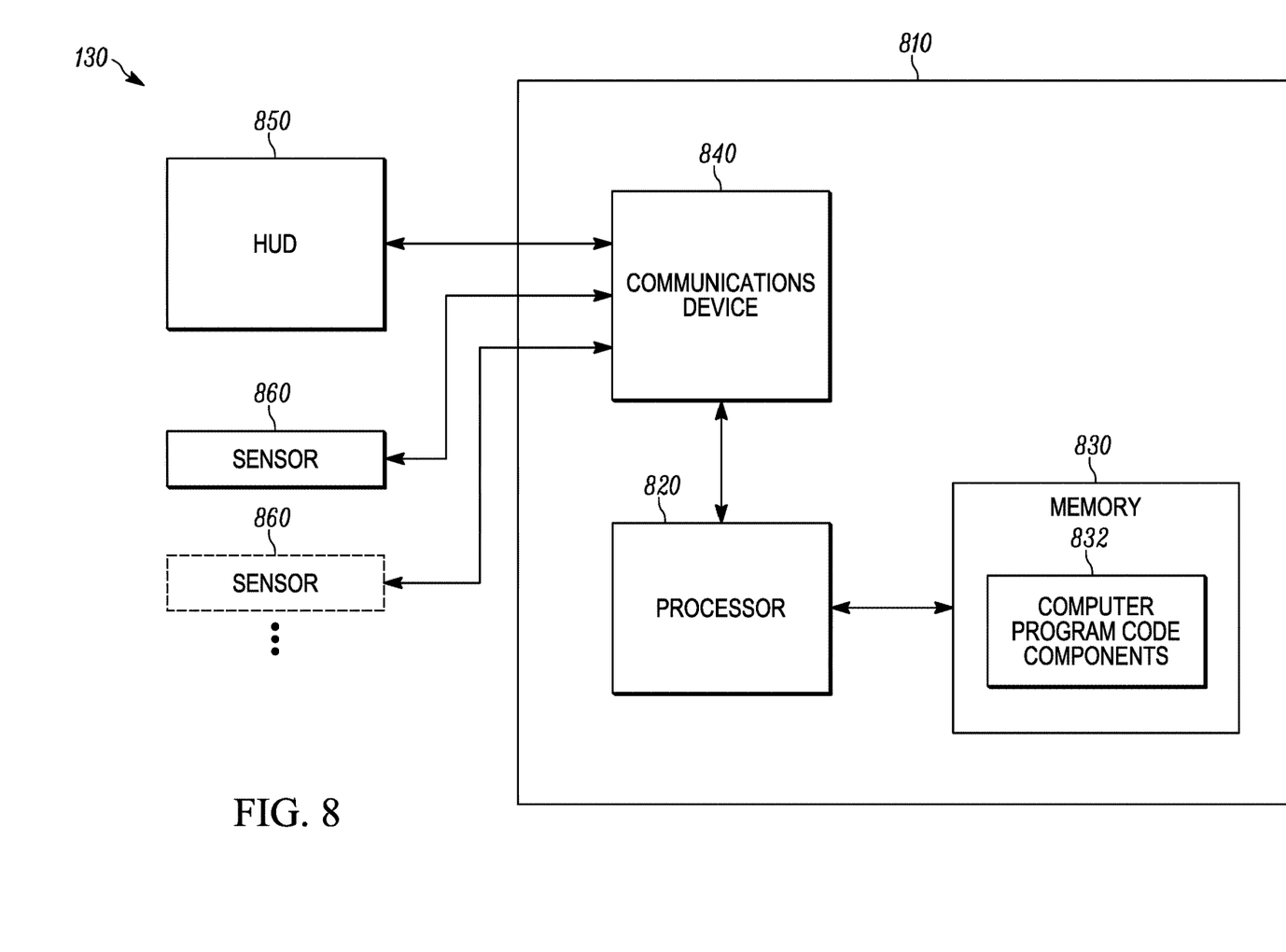
FIG. 8 is a schematic of a responder system in accordance with some embodiments.

FIG. 8 is a schematic of a responder system 130 in accordance with some embodiments. The responder system 130 comprises: a head up display (HUD) 850; one or more sensors 860; and a responder device 810 in communication with the HUD 850 and the one or more sensors 860. In some embodiments, the responder device 810 is the computing device 120. However, in other embodiments, the responder device 810 communicates with the computing device 120 to perform aspects of the present invention.

The responder device 810 comprises: a processor 820; and a memory 830. The memory 830 stores computer program code components 835 executable by the processor 820 to perform various aspects of the invention described herein. For example, some of the computer program code components 835 are executable by the processor to perform the following: receive, from a computing device and display on the HUD, assignment information that corresponds to a specific assignment; receive from the one or more sensors, real-time sensor data; and display on the HUD, an indication of progress in the specific assignment based at least in part on the real-time sensor data.

In some embodiments, the responder device 810 comprises computer program code components 835 executable by the processor 820 to determine progress in the specific assignment based on a workflow for the specific assignment. In some embodiments, the responder device 810 comprises computer program code components 835 executable by the processor 820 to: transmit the real-time sensor data to the computing device 120; and receive from the computing device 120 information regarding the progress in the specific assignment.

As will be understood by a person skilled in the art, a single memory, such as the memory 830, can be used to store both dynamic and static data. The structure of the memory 830 is well known to those skilled in the art and can include a basic input/output system (BIOS) stored in a read only memory (ROM) and one or more program modules such as operating systems, application programs and program data stored in random access memory (RAM).

One or more communications devices 840 are coupled to the processor 820. The one or more communications devices 840 include, for example, an antenna to transmit and/or receive a radio communication, a network or Bluetooth card or modem to transmit and/or receive a wired communication, and/or one or more other communications devices. In some embodiments, the one or more communications devices 840 can provide a connection to the one or more sensors 860, the HUD 850 and the server. In some embodiments, the HUD, the responder device and/or the one or more sensors can form an integral device. For example, the camera and the HUD can be part of a HUD device.

Figure 9:
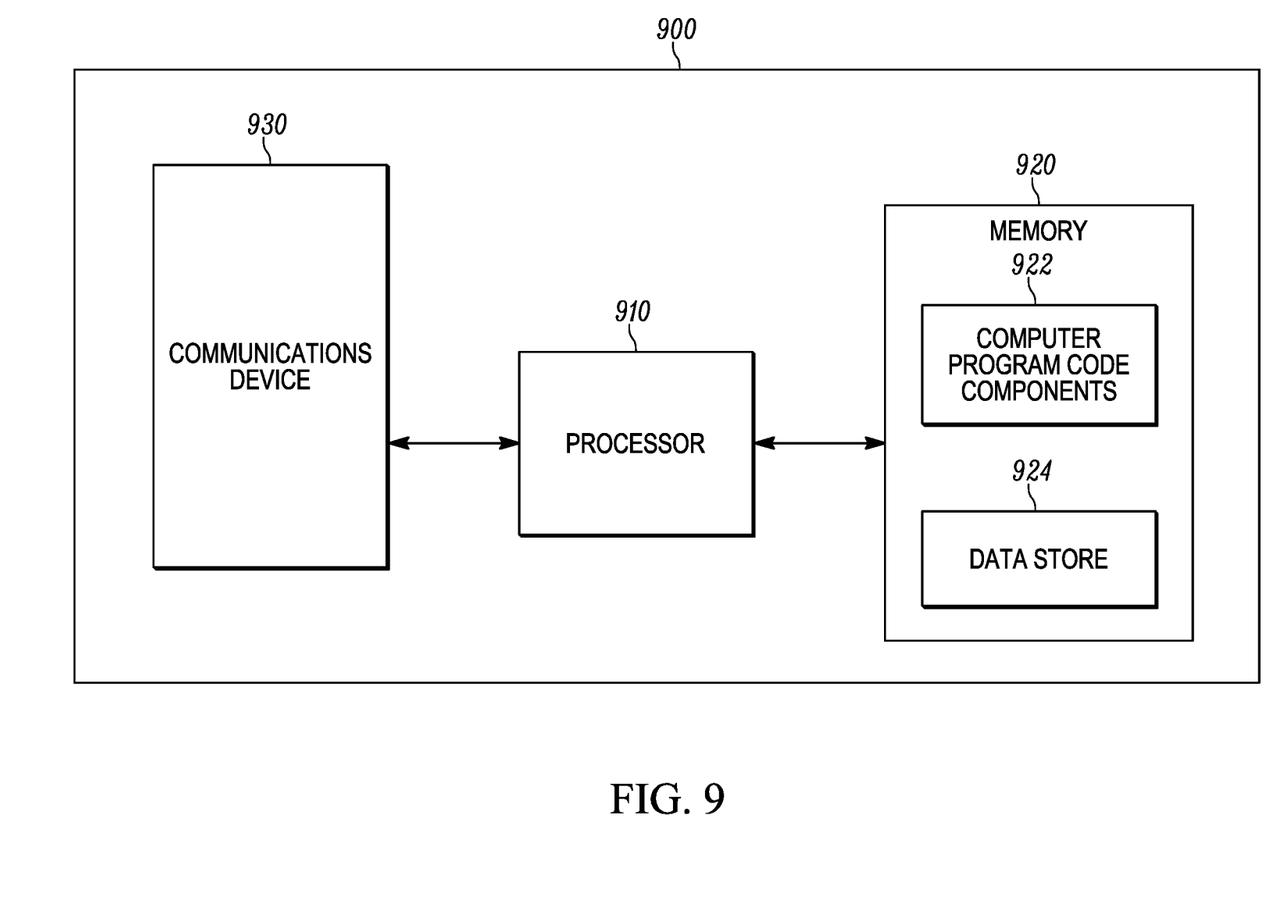
FIG. 9 is a schematic of a computing device in accordance with some embodiments.

FIG. 9 is a schematic of a computing device 900 in accordance with some embodiments. The computing device 900 is, for example, identical to the computing device 120.

The computing device 900 comprises a processor 910 and a memory 920 coupled to the processor 910. The memory 920 comprises computer program code components 922 for implementing various aspects of the present invention including various methods and functions of the embodiments described herein. The processor 910 processes the computer program code components 922 stored in the memory 920 and executes corresponding instructions. In some embodiments, the memory 920 comprises computer program code components 922 for performing one or more of the steps of method 200.

The memory 920 can also include a data store 924 to store data such as the workflows, metadata, and data from the one or more sensors. As will be understood by a person skilled in the art, a single memory, such as the memory 920, can be used to store both dynamic and static data. The structure of the memory 920 is well known to those skilled in the art and can include a basic input/output system (BIOS) stored in a read only memory (ROM) and one or more program modules such as operating systems, application programs and program data stored in random access memory (RAM).

One or more communications devices 930 are coupled to the processor 910. The one or more communications devices 930 include, for example, an antenna to transmit and/or receive a radio communication to a command device and/or a responder device, a network card or modem to transmit and/or receive a wired communication, and/or one or more other communications devices.

Hence, embodiments of the present invention can provide an augmented reality view highlighting information relevant to a responder current mission. A personalized dynamic augmented reality view can be created for each responder that highlights and/or labels assets, locations, vehicles, and other responders relevant or assigned to his/her incident, role, group, or objective within his/her current frame of view. Assignment information such as objects, people and locations can be identified to the responder on a display to reduce the workload for the responder.

Embodiments of the present invention also enable objectives to be communicated dynamically to responders and assignment progress to be collected and communicated automatically using sensors, analytics including real-time object recognition, and augmented reality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of information management for an incident response, comprising:
   receiving, at a computing device, a first communication allocating a group of responders to a specific work assignment relating to the incident;
   receiving, at the computing device, workflow information associated with the specific work assignment;
   causing, by the computing device, a graphic display device associated with one of the responders in the group of responders and a commander associated with the incident response, to indicate assignment information that corresponds to the specific work assignment;
   receiving, at the computing device from one or more sensors, real-time sensor data associated with the specific work assignment; and
   causing, by the computing device, the graphic display device to indicate a progress made in the specific work assignment based at least in part on the real-time sensor data and the workflow information.

2. The method of claim 1, wherein the assignment information includes at least one of the following:
   one or more locations associated with the incident;
   one or more objects associated with the incident;
   one or more people associated with the incident; and
   one or more other responder devices allocated to the incident.

3. The method of claim 1, further comprising: generating the workflow based on incident scene data.

4. The method of claim 1, wherein the real-time sensor data includes one or more of the following:
   a location of the responder in the group;
   a motion of the responder in the group;
   an orientation of the responder in the group;
   video of a view seen by the responder in the group; and
   audio at the responder in the group.

5. The method of claim 1, further comprising:
   identifying, via the computing device based on the real-time sensor data, one or more objects, people or locations associated with the specific work assignment.

6. The method of claim 5, further comprising:
   transmitting, from the computing device to the graphic display device, a further communication identifying the one or more objects or people associated with the specific work assignment.

7. A system for managing information for an incident response, the system comprising:
   a graphic display; and
   a computing device in communication with the graphic display and one or more sensors and associated with one of a responder in a group of responders and a commander associated with the incident response, the computing device comprising:

a processor; and a memory storing computer program code components executable by the processor to perform a set of functions including:

receive, at the computing device, a first communication allocating the group of responders to a specific work assignment relating to the incident;

receive, at the computing device, workflow information associated with the specific work assignment;

receive, from one or more sensors, real-time sensor data associated with the specific work assignment; and cause the graphic display to display the assignment information and an indication of progress made in the specific work assignment based at least in part on the real-time sensor data and the workflow information.

8. The system of claim 7, wherein the assignment information includes at least one of the following:

one or more locations associated with the incident;

one or more objects associated with the incident;

one or more people associated with the incident; and one or more other responder devices allocated to the incident.

9. The system of claim 7, further comprising the one or more sensors, and wherein the one or more sensors include a camera and the set of functions further include:

detect an object of interest associated with the specific work assignment in at least one video frame of a video stream from the camera.

10. The system of claim 9, wherein the object of interest is one of the following within the view of a responder in the group:

an asset;

a vehicle;

a person of interest; and another responder.

11. The system of claim 9, the set of functions further comprising:

displaying instructions for interacting with the object of interest on the graphic display.

12. The system of claim 9, the set of functions further comprising:

highlighting the object of interest on the graphic display.

13. The system of claim 9, the set of functions further comprising:

determining first metadata to identify the object of interest; and displaying the first metadata on the graphic display.

\* \* \* \* \*